United States Patent

[11] 3,566,805

[72] Inventor Alfred L. Meyer
 Wood Dale, Ill.
[21] Appl. No. 758,246
[22] Filed Sept. 9, 1968
[45] Patented Mar. 2, 1971
[73] Assignee Anelsberger Brothers Inc.
 Northbrook, Ill.

[54] PASTRY PRODUCT PRODUCTION SYSTEM
 15 Claims, 10 Drawing Figs.
[52] U.S. Cl. ................................................... 107/1,
 107/69
[51] Int. Cl. ..................................................... A21c 11/10
[50] Field of Search........................................... 107/1, 1
 (.6), 4, 12, 16, 19, 44, 54, 54 (.2), 54 (.6), 68, 69,
 70; 118/13, 15, 16

[56] References Cited
UNITED STATES PATENTS
| 2,632,410 | 3/1953 | Anetsberger | 107/44 |
|---|---|---|---|
| 2,754,772 | 7/1956 | Anetsberger | 107/68 |
| 2,781,732 | 2/1957 | Lenherr | (107/68)UX |
| 2,960,044 | 11/1960 | Anetsberger | 107/12 |
| 2,965,050 | 12/1960 | Doering | 107/69 |
| 2,995,107 | 8/1961 | Archer | 118/16 |
| 3,225,717 | 12/1965 | Page | 107/69 |
| 3,318,266 | 5/1967 | Rich et al | 107/69 |
| 3,354,842 | 11/1967 | Manspeaker | 107/69X |

Primary Examiner—Walter A. Scheel
Assistant Examiner—Arthur O. Henderson
Attorneys—Davis Lucas and Brewer & Brugman ABSTRACT: A pastry product production system for programmed sheeting, forming, cutting and finishing operations, comprising sheeting means for receiving pastry dough and rolling it into a continuous sheet and including variable speed motor driving means and transmission means having speed-change mechanism; makeup conveyor means for receiving the dough sheet and including a second variable speed motor driving means and selectively operable cross roller, flour brush, dough oiler, cinnamon duster, rotary cutter, paste spreader, filling depositor, and roll winder means; cutting means including a high speed guillotine unit with a third variable speed motor driving means and transmission means having speed-change mechanism, and a low speed die cut unit with a vertically reciprocal die, a fourth variable speed motor driving means and transmission means including speed-change mechanism, a normally inoperative clutch, pulse-responsive means automatically operable to effect cyclic operation of the clutch, pulse control means for periodically energizing the pulse-responsive means, means selectively operable to vary the period of the pulse control means, a brake cyclically operable to stop the die at its uppermost position, a die guide reciprocable horizontally to move the die at the bottom of its stroke with the dough being cut, selectively adjustable means for varying such horizontal throw of the die guide, and a protective hood with a safety switch for stopping operation of the system when the hood is opened: finishing means including conveyors and a fifth variable speed motor driving means; and a control unit including a variable speed generator for supplying alternating current to all of the motor driving means and selectably varying the frequency thereof to synchronize the several variable speed motor driving means, and means for individually adjustably controlling operation of the sheeting, makeup, cutting and finishing means to selectively program the production of different types of products, including means for indicating and controlling the speed of the generator, means for indicating the output speed of each transmission means, and selectively operable controls for each speed-change mechanism.

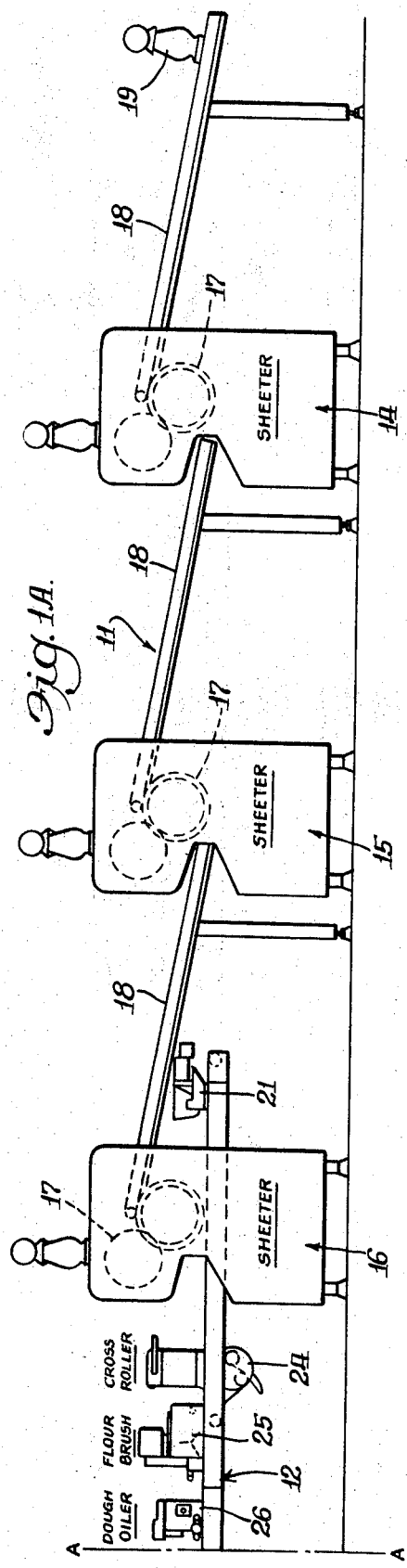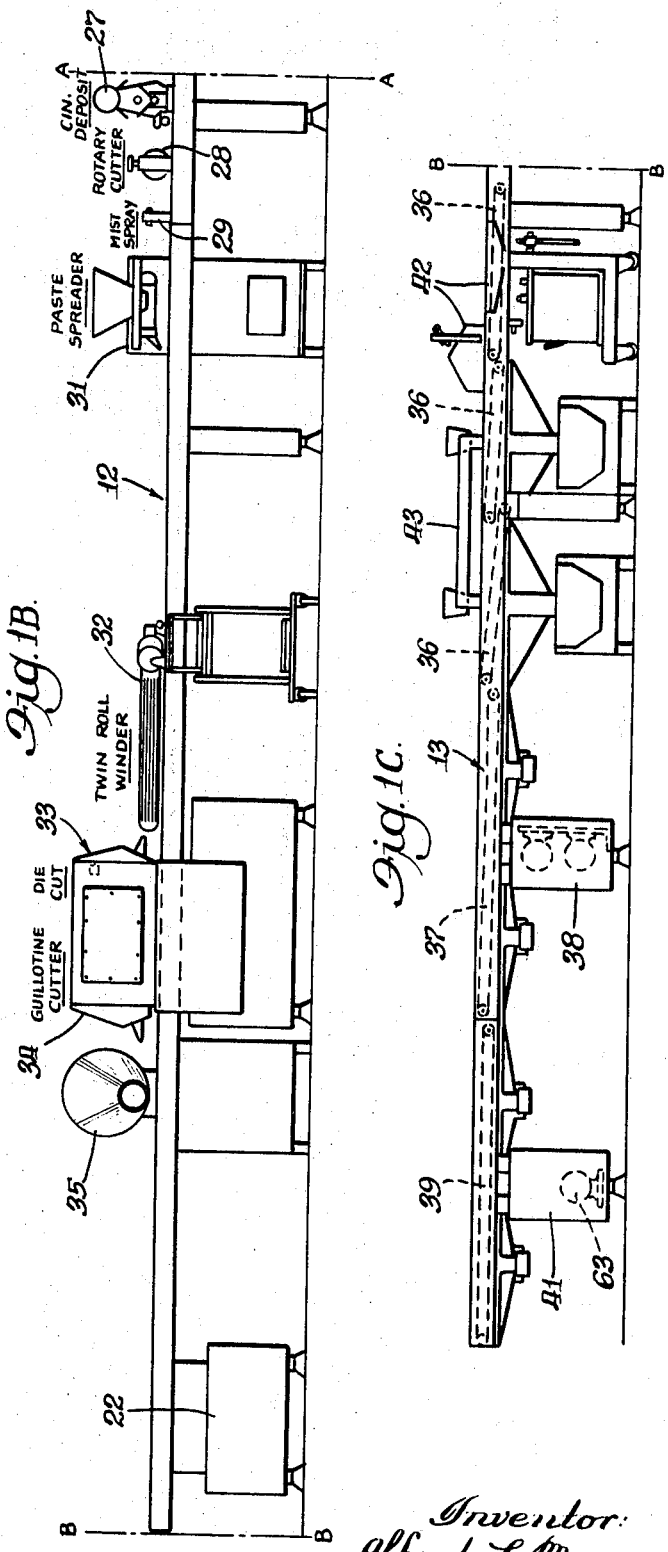

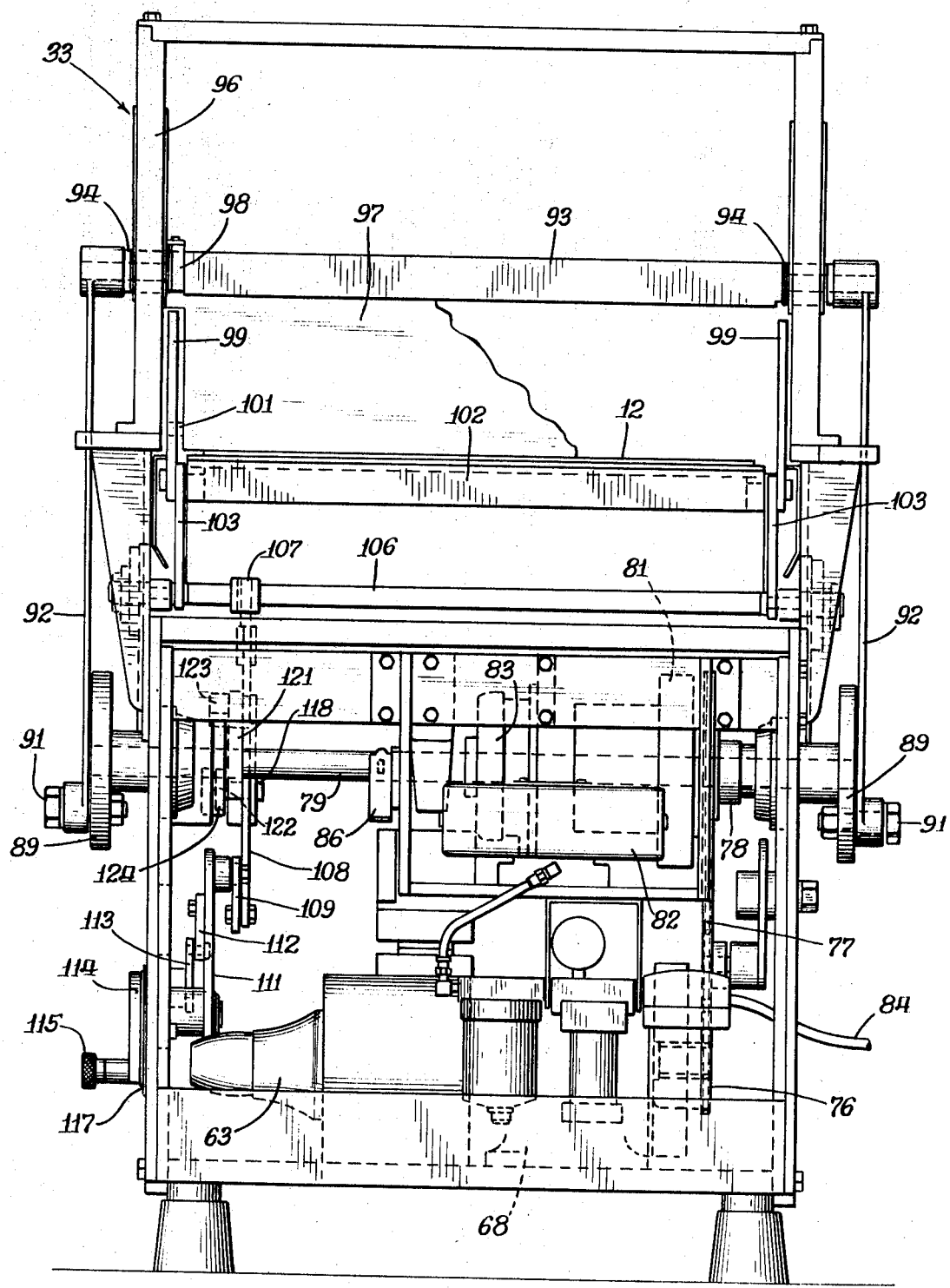

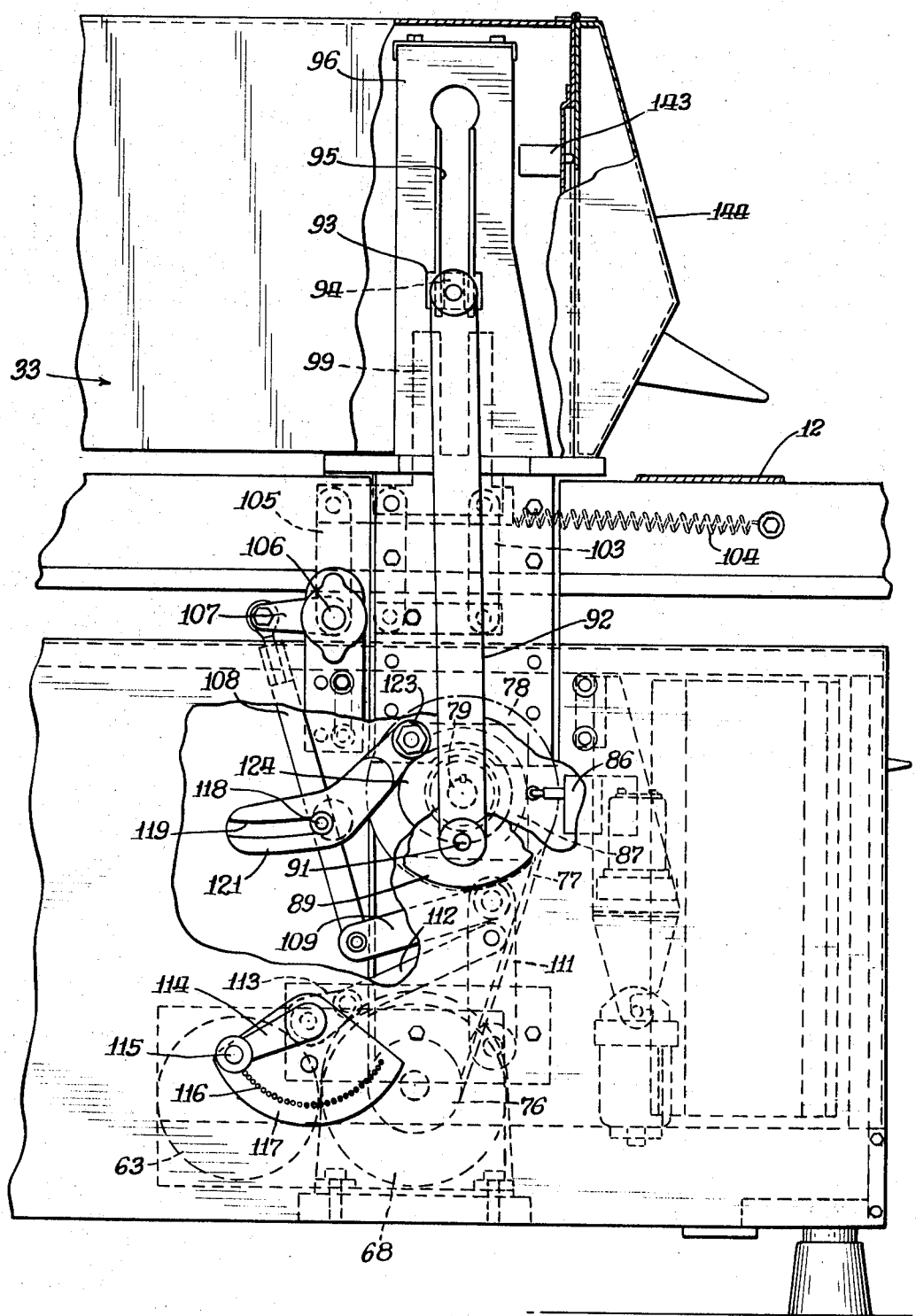

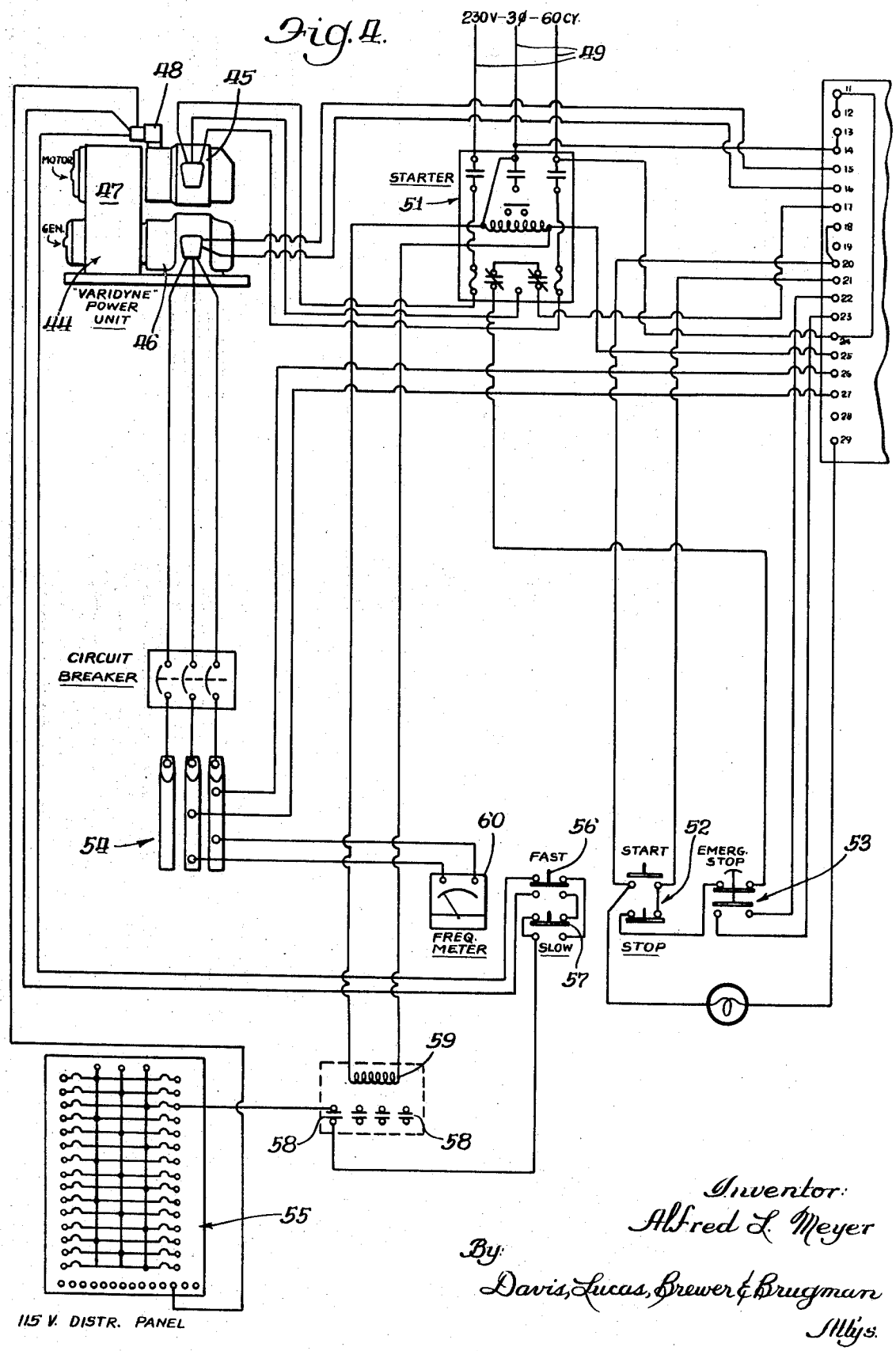

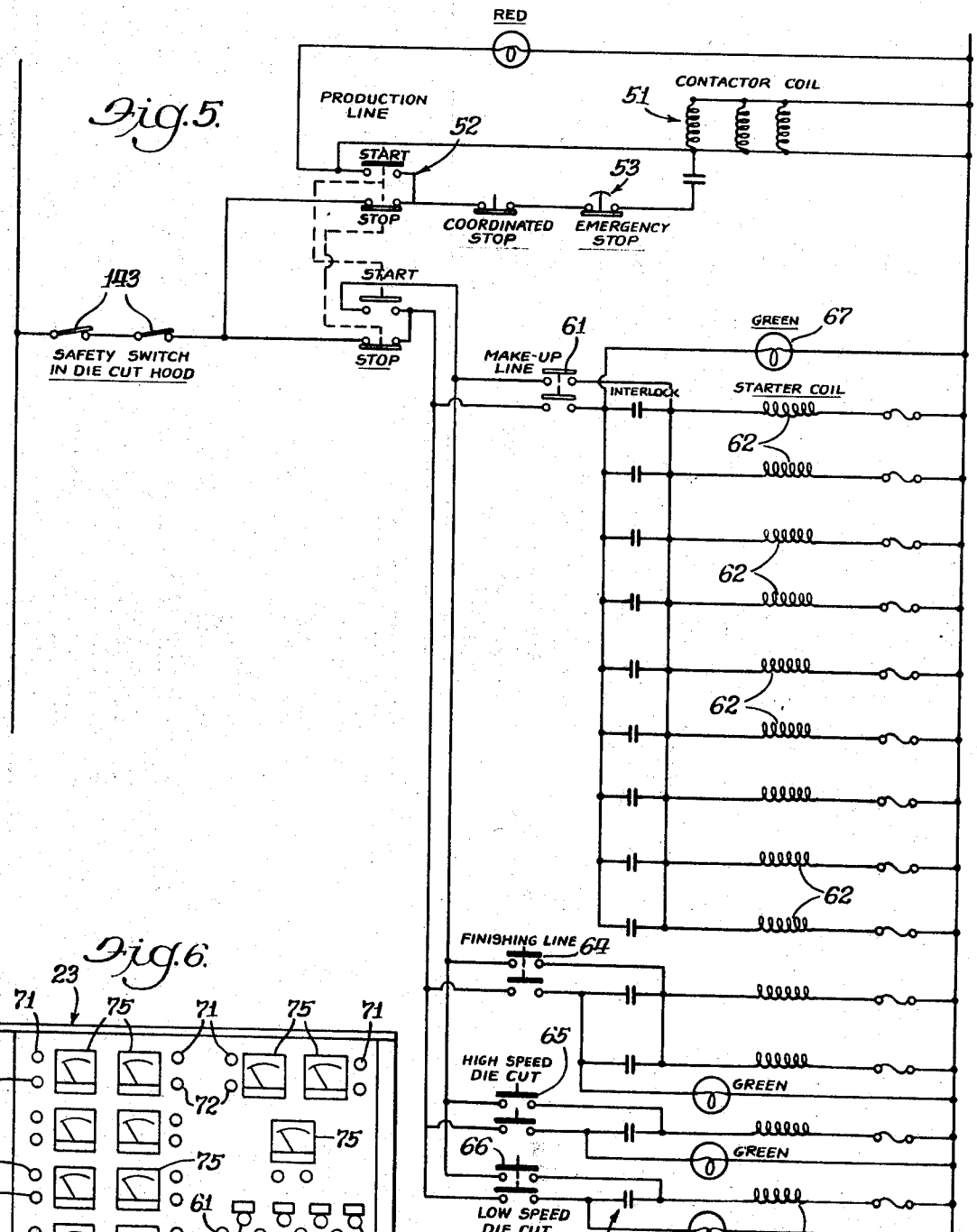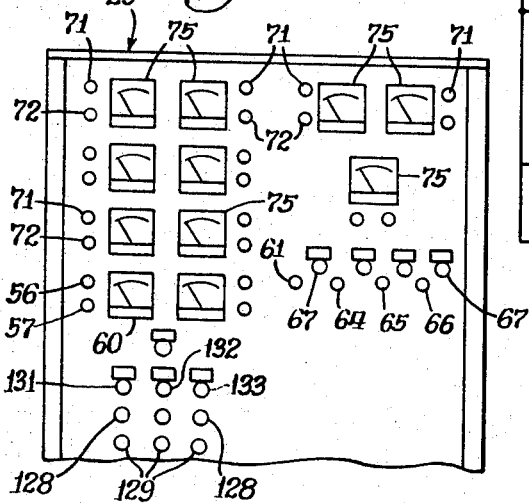

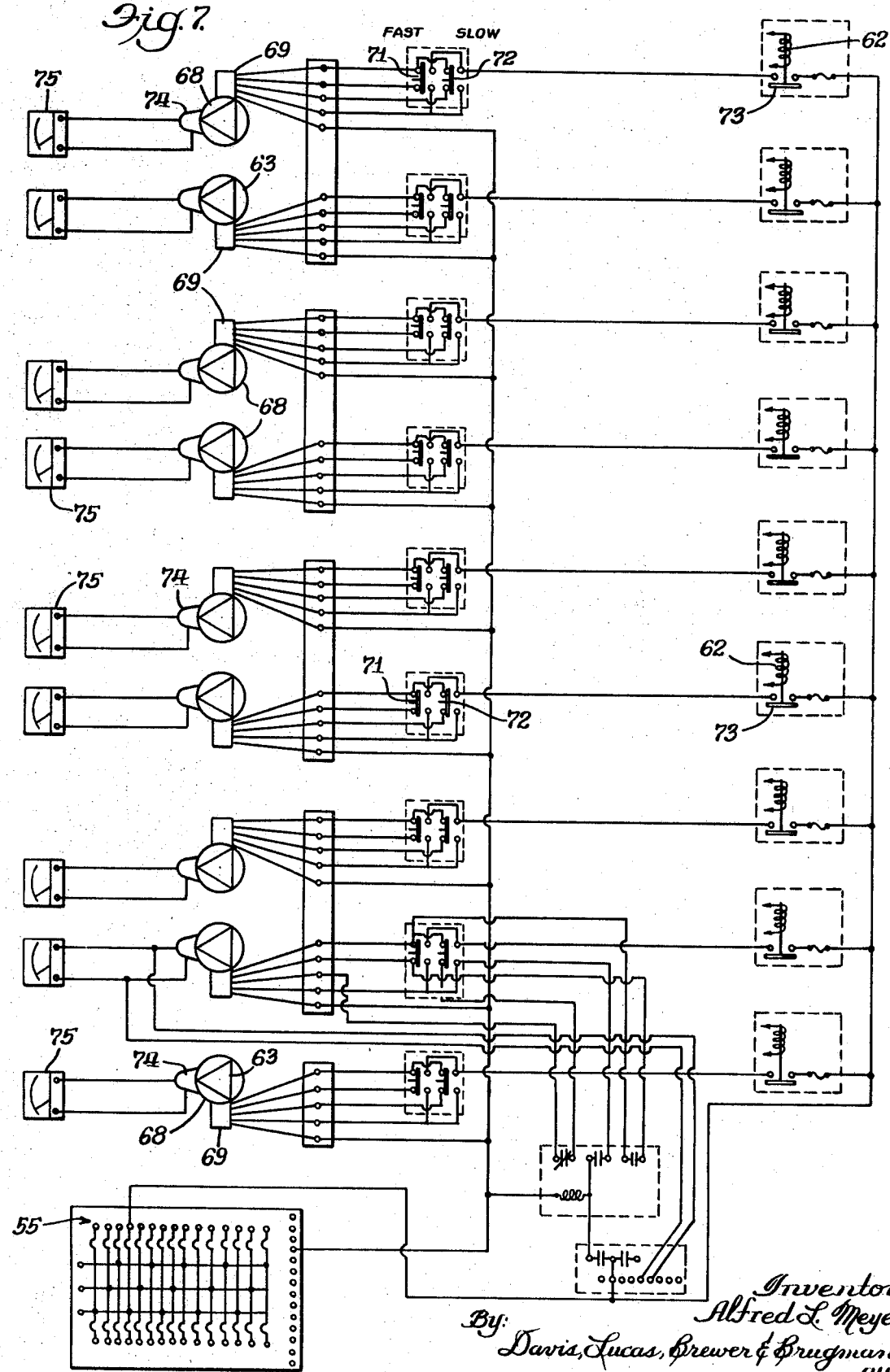

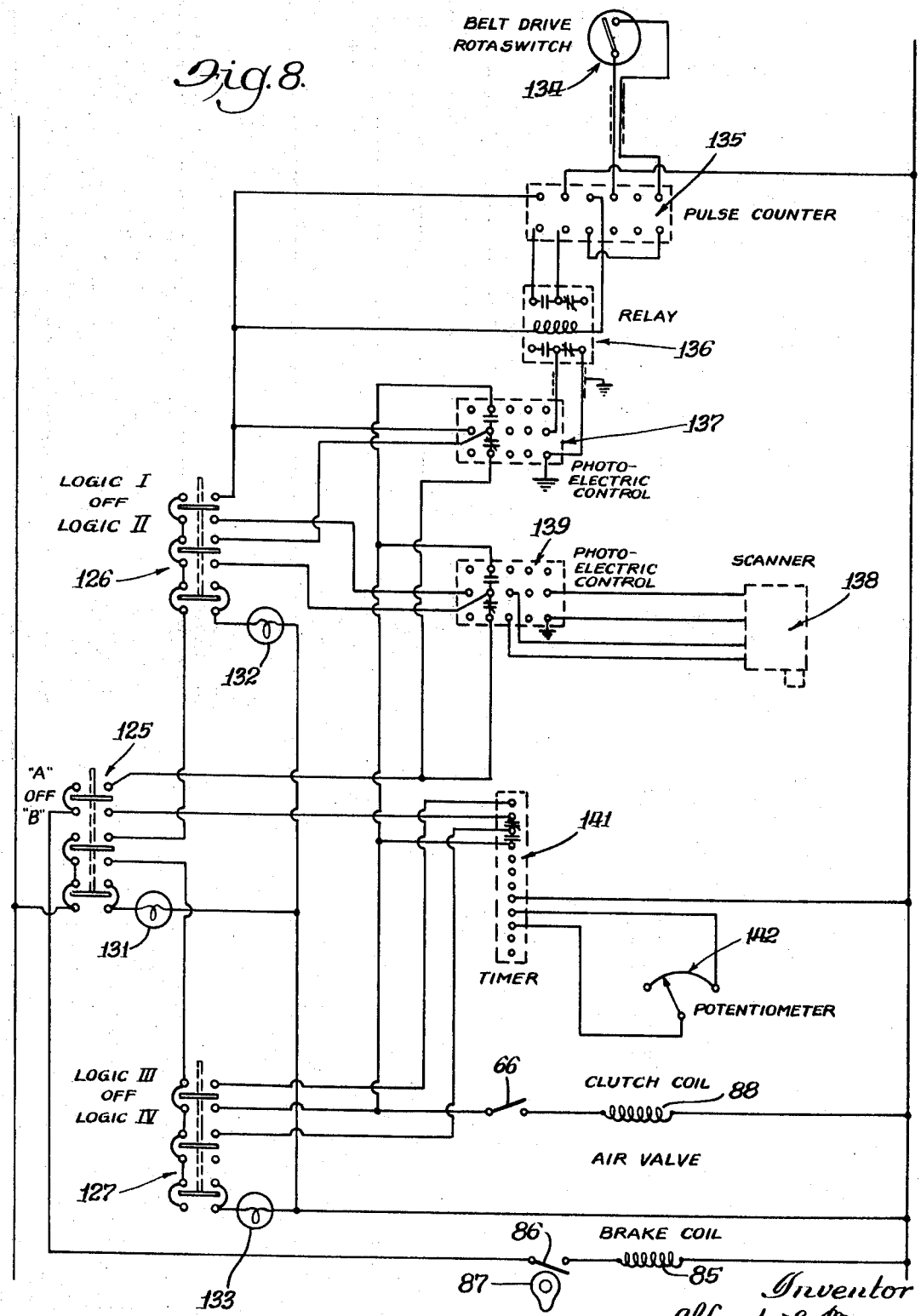

3,566,805

PASTRY PRODUCT PRODUCTION SYSTEM

BACKGROUND OF THE INVENTION

1. Field of the Invention

The invention relates generally to commercial production of pastry products, and more particularly to an automated pastry product production system that may be selectively programmed from a single control station for producing different products.

2. Description of the Prior Art

In prior pastry product production systems, the dough sheeting, makeup and finishing operations have been carried out serially with individually adjustable units arranged to follow each other in sequence, but it has been very difficult to keep up continuous and uninterrupted operations with no accurate way of insuring exactly proper speed of operation of each individual unit. And revising and adjusting the condition and speed of operation of the individual units to produce different pastry products has required a high degree of skill and experience on the part of the operators.

SUMMARY OF THE INVENTION

To enable commercial production of a wide variety of products most uniformly and economically, this invention provides a pastry product production system for programmed sheeting, forming and cutting operations, comprising sheeting means for receiving pastry dough and rolling the same into a continuous sheet and including variable speed motor driving means and transmission means having speed-change mechanism for adjustably determining sheeting roller speed and dough sheet thickness; makeup conveyor means for receiving the dough sheet and including a second variable speed motor driving means and selectively operable forming and filling means; cutting means including additional variable speed motor driving means and transmission means having speed-change mechanism for adjustably determining the frequency of cutting die reciprocations; finishing means including conveyors and further variable speed motor driving means; and a control unit including means operable to synchronize said several variable speed motor driving means and selectively determine the production rate of the system, and means for individually adjustably controlling operation of the sheeting, makeup, cutting and finishing means, including means for indicating the output speed of each transmission means, and selectively operable controls for each speed-change mechanism. The cutting means includes a vertically reciprocal holder for different types of dies intermittently or continuously operable cyclically, with selectively operable means for varying the cyclic period or frequency of vertical reciprocation, a die guide reciprocable horizontally to move the die at the bottom of its stroke with the dough being cut, selectively adjustable means for varying the horizontal throw of the die guide, a brake cyclically operable to stop the die at its uppermost position, and a protective hood with a safety switch for stopping operation of the system when the hood is open.

In the drawings:

FIGS. 1A, 1B and 1C are diagrammatic elevational layouts of a pastry product production system embodying the features of this invention;

FIG. 2 is a front elevational view of the cutting unit with parts broken away and parts in section;

FIG. 3 is a side elevation with parts broken away of the intermittent or low-speed die cut portion of the cutting unit;

FIG. 4 is a wiring diagram for the remotely controlled power unit for supplying frequency-variable current to a plurality of slave motors for the system components for determining the production rate of the system;

FIG. 5 is a wiring diagram for a portion of the control unit including the slave motor selector switches;

FIG. 6 is an elevational view of the panel of the remote control unit;

FIG. 7 is a wiring diagram for a portion of the control unit for selectively controlling the speed-change mechanisms; and FIG. 8 is a schematic diagram for the low-speed die cut controls.

DESCRIPTION OF THE PREFERRED EMBODIMENT

Referring more particularly to FIGS. 1A, 1B and 1C, a pastry product production system is therein illustrated which is made up of sheeting means indicated generally by reference numeral 11 (FIG. 1A), makeup conveyor means 12 (FIGS. 1A and 1B), and finishing means 13 (FIG. 1C) which are serially joined in any suitable manner to provide a continuous straight-line system.

As shown in FIG. 1A, the sheeting means 11 comprises three individual dough sheeters 14, 15 and 16 of well-known construction which are arranged serially and each of which includes sheeting rollers 17, an infeed endless belt conveyor 18, means for adjusting the sheeting rollers to produce desired thickness of dough, and variable speed motor driving means for the rollers 17 and the conveyor 18 which will be described in greater detail hereinafter. Other than the variable speed motor driving means, these sheeters may be similar to those disclosed in U.S. Letters Pat. No. 2,655,118 of Oct. 13, 1953 and No. 2,960,044 of Nov. 15, 1960. An infed flour duster 19 of known construction is provided on the first sheeter 14, and a suitable makeup flour duster 21 is associated with the third sheeter 16.

The sheeting means 11 delivers a continuous sheet of dough of desired thickness and at a selected linear speed to the makeup conveyor means 12 which comprises an endless belt of suitable construction with appropriate takeup adjustment and driven by an end drive 22 (FIG. 1B) including variable speed motor driving means similar to those for the dough sheeters 14—16 and, like them, remotely controlled from a centralized control panel 23 (FIG. 6) where driving speeds are indicated and may be selectively controlled for programming for the production of desired pastry products and determining the speed of such production, as more fully described later.

Also comprising part of the makeup means for forming, cutting and otherwise selectively working up the pastry products are a cross roller 24 (FIG. 1A) which may be like that of U. S. Letters Pat. No. 2,621,623, dated Dec. 16, 1952, a flour brush 25 for removing excess flour from the dough sheet, such as that of No. 2,632,410 of Mar. 24, 1953, a dough oiler 26, a cinnamon duster 27 (FIG. 1B), a rotary cutter 28 for slicing or slitting the dough sheet lengthwise, a mist spray 29, an extrusion type paste spreader and filling depositor 31 for smooth and fruit fillings, and twin roll winders 32 generally similar to that of No. 2,674,209, issued Apr. 6, 1954, all disposed in sequence on, and in cooperative relationship relative to, the makeup conveyor 12.

Also cooperating with the latter, which passes longitudinally therethrough, is a novel cutting means comprising a low-speed die cut unit, indicated generally by reference numeral 33, and a high-speed guillotine unit 34 which is like that disclosed in U.S. Letters Pat. No. 2,660,133 of Nov. 24, 1953 or No. 2,754,772, issued Jul. 17, 1956. This cutting means severs, stamps with special dies, and seals desired lengths of doughstrips, filled or unfilled, is controlled in a manner later to be described from the panel 23, and the die cut unit 33 is individually unique, as will appear from the following specific description of it. The makeup conveyor 12 further includes a twisting unit 35 and delivers the end products to the finishing means 13.

The finishing means 13 is illustrated in FIG. 1C and includes conveyor means comprising three 3-foot sections 36 and one 6-foot section 37 driven in well-known manner by variable speed motor drive means 38, and an end section 39 with variable speed motor drive means 41, as well as a spray unit 42 and a twin hopper sugaring unit 43 for final treatment of the dough products before cooking and panning.

As previously noted, this production system is centrally controllable from the control unit 23, and in order to synchronize the several variable speed motor driving means, as for the sheeters, 14, 15 and 16, end drive 22 for makeup conveyor 12, paste spreader 31, die cut 33, guillotine 34, and drives 38 and 41 for the finishing conveyor means, slaves, preferably but not necessarily synchronous induction motors, are employed which receive power from a "VARIDYNE" power unit 44 (FIG. 4). This unit 44 comprises a motor 45 and an output generator 46 driven thereby through a variable speed mechanical drive or transmission 47, including a speed-change mechanism, such as a V-belt, interconnecting two pairs of sheaves adjustable axially toward and away from each other, and a reversible motor 48 for effecting positioning of the sheaves to determine the speed of the generator 46, and thereby the frequency of the alternating current supplied by it. As shown in FIG. 4, the motor 45 is supplied with power from any available 230-volt, 3-phase, 60-cycle source 49 through a suitable line voltage type starter 51 under the control of a start-stop switch 52 and an emergency stop switch 53. The variable frequency output from the generator 46 is carried to a suitable distribution point, as shown at 54 in FIG. 4. From a 115-volt distribution panel 55, power is supplied to the reversible motor 48 through normally open "fast" or "slow" switches 56 or 57 and contacts 58 of an interlock including a coil 59 which is in parallel with the coil of main starter 51 so that such contacts 58 are closed only when motor 45 is energized. This provides an interlock to prevent operation of reversible motor 48 to adjust the speed-change mechanism of the transmission 47 unless the motor 45 is operating.

Connected into the output line from the generator 46 is a meter 60 for indicating the frequency of the power being supplied to the several synchronized variable speed motor driving means or slaves through the distribution panel 54. As seen in FIG. 6, this frequency meter 60 and the fast and slow switches 56 and 57 are mounted in the control panel 23 so that the speed of production of the system may be observed and varied as desired from that point. Holding normally raised switch 56 depressed, as will be seen from FIG. 4, will energize motor 48 to rotate in one direction to increase the speed of rotation of generator 46 to correspondingly increase the frequency of its output, which will be indicated visually by meter 60, and the frequency will remain constant when the switch is released. Similarly, that frequency of the power from generator 46 may be decreased by holding switch 57 depressed to cause motor 48 to rotate in a reverse direction. Thus, the output from generator 46 may be selectively controlled to vary the speed of the slave motors operated thereby to actuate the individual components of the system.

As previously noted, there are two such slave motors or variable speed motor driving means for each sheeter 14, 15 and 16, as well as one each for end drive 22, paste spreader 31, die cut 33, guillotine 34, and conveyor drives 38 and 41. In order to selectively control operation of the different sections of the system from the control unit or panel 23, selector switches are provided, as illustrated in FIGS. 5 and 6, comprising a makeup line switch 61 for energizing starter coils 62 for the several slave motors 63 (FIG. 7) for the makeup line components, other than the die cut 33 and guillotine 34, including the makeup conveyor end drive 22 and two for each sheeter 14, 15 and 16. These selector switches also include a finishing line switch 64 for energizing starter coils 62 for slave motors 63 for the drive means 38 and 41, and switches 65 and 66 for energizing starter coils 62 for slave motors 63 for the high-speed die cut 34, and the low-speed die cut 33, respectively.

As illustrated in FIG. 6, the selector switches 61, 64, 65 and 66 are mounted in the control unit 23, and a visual indicator in the form of a light 67 is connected in series with each selector switch which remains energized when its associated selector switch 61, 64, 65 or 66 is closed. Thus the operator from his control station may select which of the several sections of the system are to be operative in response to operation of the generator 46, and will receive a visual indication from the lights 67 of which of those sections are operating. Each of the slave motors or variable speed motor drive means 63 receives its power from the generator 46 in a readily apparent manner, and the speeds of all of these slaves will be accurately synchronized at all times and may be changed as desired simultaneously in response to operation of the speed-change motor 47 under control of switches 56 and 57, as previously described.

Each slave motor 63, except that for the pastry spreader 31, drives its associated unit through a transmission means comprising a mechanical drive 68 (FIG. 7), preferably like the transmission drive 47 previously described, and a speed-change mechanism including a reversible motor 69 similar to the motor 48 of the power unit 44. As shown in FIG. 7, each such reversible motor 69 is individually controllable by a "fast" switch 71 and a "slow" switch 72 similar, respectively, to the switches 56 and 57 for the motor 48 of the power unit 44, and operable to connect the motor 69 to a suitable source of power from the distribution panel 55 through an individually connected or associated lockout switch 73 which normally is open and is closed only when the starting coil 62 for the associated slave motor 63 is energized, as previously described. The speed-change mechanism of the transmission means 68 for any one of the units of the entire system thus may be actuated to individually adjustably control the speed of operation of that unit to selectively program the production of different types of products.

As will be understood by anyone skilled in the art, different products that may be made with this system, such as apple rings, turnovers, cinnamon bread, Danish nut squares, snakes, snails, whirls, etc., require the use of different combinations of the individual units available and various different relative speeds of operation thereof. Programming of the system is accomplished in the most simple manner possible by enabling the operator to initiate operation, selectively set the proper individual speeds of operation of the desired units in accordance with program information furnished for each type of product, and then vary the speed of production of the entire system.

To this end, in addition to the several individually controllable reversible motors 69 comprising speed-change mechanisms adjustable in response to selective operation of the associated fast and slow switches 71, 72, the system includes individual means for indicating to the operator at the control panel 23 the output speed of the several transmission means 68 individually so as to permit him to accurately adjust the same. As best seen in FIG. 7, a standard electrical tachometer 74 of well-known construction and functioning as a small generator is drivingly connected to the output end of each transmission means 68 and electrically connected to a galvonometer 75 which is mounted on the control panel 23 (FIG. 6) adjacent the associated fast and slow switches 71, 72 for indicating the output speed of that particular transmission means. The operator thus is enabled to actuate the switches 71, 72 selectively at the control panel to accurately set the output speed of each transmission means 68 individually as required for any specific pastry product.

This includes individually determining the dough thickness setting of each of the sheeters, 14, 15 and 16, as by means of the three uppermost control groups of switches 71, 72 and indicator 75 in the first or left-hand column of such control groups shown in FIG. 6, and the roller speeds of each sheeter, as by means of the three uppermost control groups 71, 72, 75 in the next column to the right thereof. In thus regarding the control panel, it will be noted that switches 56, 57 and meter 60 complete such left-hand column, and the lowermost group of switches 71, 72 and indicator 75 in the next column to the right may be those associated with the finish conveyor controlled by the finishing line switch 64. Likewise, the two control groups of switches 71, 72 and indicator 75 at the upper right-hand portion of panel 23, as shown in FIG. 6, may be associated, respectively, with the high-speed die cut selector switch 65 and the low-speed selector switch 66, and the control group therebelow with the end drive 22 for the makeup conveyor 12. Of course, it will be understood that the particular arrangement of the controls on the panel 23 is not important.

What is important is that this pastry production system enables a single operator to accurately and selectively program the same from a single control station for producing a wide variety of different products and to select and vary at will the rate of production thereof, while insuring absolutely identical operations and product uniformity at different times without regard to interim changes in selective settings. At the same time, the electrical interlocks described require proper sequential operation of the controls and prevent burnout of the motors. In connection with the programming of the system for the production of different pastry products, the various sections of the system may be employed as desired, and the wide variety of products that may be made is due in part to the novel features of the low-speed die cut unit 33 which insures an extremely wide variety of cutting patterns and great flexibility, including intermittent, continuous or combined intermittent and continuous cutting.

Referring more particularly to FIGS. 2 and 3, the low-speed die cut unit 33 is shown as incorporating one of the previously described slave motors 63 (which is controlled by the selector switch 66) comprising its variable speed motor driving means and associated transmission means including speed-change mechanism and a mechanical drive 68 for driving a pulley 76 and a belt 77 cooperating therewith. The belt 77 drives a pulley 78 (FIG. 2) rotatably mounted in well-known manner on a horizontal drive shaft 79 extending transversely of the die cut unit which in turn is suitably rotatably mounted in the frame thereof. A normally disconnected clutch 81 is mounted on the drive shaft 79 adjacent the driven pulley 78 which is adapted to be rendered operative in well-known manner by means of an air valve 82 which normally maintains a brake 83 (also mounted on the drive shaft 79) operative to prevent rotation of the shaft. The valve 82 normally applies air under pressure from a suitable source 84 (FIG. 2) to the brake 83 to maintain the same operative. The air valve 82 is moved from such normal brake-operative position by energization of a suitable coil or solenoid 86 (FIG. 8) which is energized in response to a microswitch 86 by a cam 87 (FIG. 3) mounted on the drive shaft 79. A clutch coil or solenoid 88 (FIG. 8) 8) also is operatively associated in similar manner with the air valve 82 so that, when the same is energized in a manner later to be described, it moves the air valve from brake-operating to clutch-operating position to render operative the clutch 81 to effect rotation of the drive shaft 79 by the transmission means 68 and members 76—78. Thus, energization of the clutch coil 88 results in a cycle of operation comprising one complete revolution of the drive shaft 79, with the brake being reactivated to terminate such cyclic operation in response to closing of the brake coil switch 86 by the cam 87.

Secured to the outer ends of the drive shaft 79 are crank discs 89 which are pivotally connected at 91 to the lower ends of crank arms 92. The upper end of each crank arm 92 is journaled on an outer end of a die frame or carrier 93 (FIG. 2) which is provided adjacent the journaled connections with the crank arms 92 with suitable guide blocks 94. Each guide block 94 is slidably disposed in a vertical slot 95 in an upstanding frame member 96 (FIG. 3), whereby rotation of the drive shaft 79 results in vertical reciprocation of the die frame or carrier 93. The frame 93 is adapted to carry any desired type of die 97 for vertical reciprocations therewith, the die depending therefrom and being secured thereto in any suitable manner, as by means of attachment or hanger members 98 as shown in FIG. 2.

It will be understood that the cutting die 97 normally is disposed in its uppermost inoperative position and that as it descends in response to cyclic operation of the drive shaft 79, the lower dough-cutting portions thereof approach the upper reach of the endless belt of the makeup conveyor means 12, which passes through the unit 33 as illustrated in FIGS. 1B, 2 and 3, and that at its lowermost point, the die makes noncutting instantaneous contact with the conveyor belt.

The lower portion of the die 97 cooperates with novel guide means comprising a pair of upstanding die guides 99 vertically slotted (FIG. 3) to receive and cooperate with suitable guide pins 101 (FIG. 2) extending laterally from the die 97. These slotted guides 99 are interconnected adjacent their lower ends by a horizontally disposed and transversely extending die guide backing plate 102 (FIG. 2) and are supported for reciprocal translational movements longitudinally of the conveyor belt 12 by any suitable means, such as parallelogram linkages 103 (FIG. 3) pivotally interconnecting the die guides 99 and the machine frame. A spring 104 (FIG. 3) is interconnected between the machine frame and the forward end of one of the die guides 99 to resiliently retain this die guide mechanism in its normal forward position in which the vertical slots in the die guides 99 are vertically aligned with the associated guide slots 95.

The rear end of each die guide 99 is pivotally connected to a link 105 (FIG. 3), the lower end of which is secured in any suitable manner to a laterally extending rocker shaft 106 rotatably supported in the machine frame. A crank arm 107 is secured to this shaft 106, extends rearwardly therefrom, and is pivotally and adjustably connected in any suitable manner to the upper end of a thrust-rod 108. The lower end of the thrust-rod 108 is pivotally interconnected by means of a rearwardly extending link 109 to an upstanding link 111, the lower end of which is pivotally secured in any suitable manner to the machine frame.

These members 108, 109, and 111 comprise an adjustable linkage which may be selectively positioned in the following manner to determine the extent or degree of longitudinal movements which will be imparted to the thrust-rod 108. An adjusting link 112 is pivotally connected at its forward end to an intermediate portion of the upstanding link 111 and at its rear end to a crank arm 113 which is secured to a suitable shaft journaled in and extending outwardly through the frame of the machine and having a crank handle 114 mounted on its outer end. An outwardly extending and inwardly spring-urged knob 115 of well-known construction is mounted on the free end of this crank handle 114 and is provided with an inwardly extending detent adapted to engage in any one of a plurality of apertures 116 (FIG. 3) arcuately disposed in a latching plate 117 suitably mounted on the exterior of the machine frame.

With this arrangement, it will be seen that selective positioning of the crank handle 114 will result in the same being retained in selected position by the detent on the knob 115 engaging in one of the apertures 116, and that such positioning of the crank handle 114 will correspondingly position the thrust-rod 108. In FIG. 3, these parts are illustrated in their "inoperative" position wherein a pin 118 carried by and extending laterally from the rod 108 is disposed at the forward end of a slot 119 through which it slidably extends and which is provided in the rear arm of a walking beam lever 121 which is pivotally mounted at 122 (FIG. 2) intermediate its ends to the machine frame, and the forwardly extending arm of which lever is provided with a suitable roller 123 that is in peripheral engagement with a disc cam 124 mounted upon the drive shaft 79. When the adjustable linkage is in its position of FIG. 3, the pin 118 carried by the rod 108 will be axially aligned with the center of the pivot 122 of the lever 121. Consequently, rocking movements of the walking beam lever 121 in response to rotation of the cam 124 during a cyclic operation of the drive shaft 79 will be idle and will not be transmitted to the thrust-rod 108. However, as the lower end of the rod 108 is moved rearwardly (to the left in FIG. 3), the pin 118 will be moved along the slot 119 in the walking beam 121, and subsequent cyclic operation of the drive shaft 79 will result in reciprocation of the thrust-rod 108 through a distance proportional to the distance to which the pin 118 has been moved rearwardly from its idle position of FIG. 3. The resulting reciprocation of the thrust-rod 108 will be transmitted through the crank arm 107, rocker shaft 106 and links 105 to the die guides 99 and die guide backing plate 102. The cam 124 is so designed and positioned that the resulting rearward movement of the die guide means and backing plate will coincide with the movement of the upper reach of the conveyor belt 12 as the die 97 is performing a dough cutting operation so as to effect longitudinal movement of the lower part of the die substantially coincident with the movement of the conveyor belt. And the parts are so dimensioned that the return or forward movement of the die guide means, backing plate and the lower end of the die 97 will be accomplished during the up-stroke of the die, and the brake coil 85 will be energized to effect stopping of the die at its uppermost point of travel.

It thus will be seen that the horizontally reciprocable guide means 99 for the lower dough-cutting part of the die may have any desired degree of movement or throw over a considerable range imparted to it during each cycle which is determined by the selectively adjustable means comprising the thrust-rod 108, pin 118, centrally-pivoted walking beam 121, with the slot 119 extending outwardly from its pivot and receiving the pin 118, and the linkage operable by crank handle 114 for selectively moving the rod 108 to variably position the pin 118 in the slot 119 from a point coincident with the pivot 122 of the beam 121 resulting in zero throw to an outermost point resulting in maximum horizontal throw of the die guides 99. At the same time, the force for effecting such horizontal throw of the lower portion of the vertically reciprocating die is derived from a source (drive shaft 79) other than the conveyor belt 12 or the means for driving it, and the backing plate 102 most effectively supports that portion of the belt being contacted by the die.

As previously indicated, energization of the clutch coil 88 effects movement of the air valve 82 from its normal brake-operative position to clutch-operating position to initiate a cyclic operation of the die cut unit 33 that normally is terminated automatically by energization of the brake coil 85 which returns air valve 82 to normal position to actuate the brake 83. In this clutch control means, the coil 88 performs as a pulse-responsive means for effecting cyclic operation of the clutch 81 and the die cut unit 33, and for operative energization requires only a pulse of approximately one-tenth of a second. In order to enable the operator most effectively to employ the die cut unit 33, pulse control means are provided which are selectively operable in response to movement of the make-up conveyor 12, photoelectric control means controlled by movement of dough pieces on the conveyor 12, or electric timer means adjustable to vary the time interval between successive energizations of the pulse-responsive clutch coil 88, or may be set to provide continuous power to the clutch coil 88 and to disconnect power to the brake coil 85 to effect continuous operation of the die cut unit 33, all to determine the frequency of operations of the die cut unit specifically suited to the nature of the particular pastry product being turned out by the system.

These pulse control means are shown schematically in FIG. 8, and include three normally open, double throw, multiple contact switches 125, 126, and 127 which may be raised or lowered selectively to operative positions, respectively, by associated pairs of control members 128 and 129 illustrated on control panel 23 in FIG. 6. Also shown in FIG. 6 as well as FIG. 8, are three indicator lamps 131, 132 and 133 associated, respectively, with switches 125, 126 and 127 and their control members 128, 129. The pulse control means are adapted to effect operation of the die cut unit 33 in any one of four operating methods, which will be referred to as Logics I, II, III and IV, and only that one selected by the operator in programming, as follows.

Logic I: operation of the two leftmost controls 128 in FIG. 6 which moves switches 125 and 126 to their upper active positions indicated in FIG. 8 as "A" and LOGIC I, and lights indicator lamps 131 and 132.

LOGIC II: operation of the leftmost control 128 and the center control 129 in FIG. 6 which moves switch 125 to its upper active position "A" and moves switch 126 to its lower active position indicated as LOGIC II in FIG. 8, and also lights indicator lamps 131 and 132.

Logic III: operation of the leftmost control 129 and the rightmost control 128 in FIG. 6 which moves switch 125 to its lower active position "B" and switch 127 to its upper active position indicated LOGIC III in FIG. 8, and lights indicator lamps 131 and 133.

Logic IV: operation of the two outermost controls 129 in FIG. 6 which moves switches 125 and 127 to their lower active positions indicated as "B" and LOGIC IV in FIG. 8, and also lights indicator lamps 131 and 133.

So setting the switches 125 and 126 to their upper active positions for LOGIC I renders operative a normally inoperative pulse generator 134 (FIG. 8), such as a "Rotaswitch" operable by the belt drive for the makeup conveyor 12, the output pulses of which are counted in well-known manner by a low powered predetermining counter 135. When the predetermined count has been reached in the counter 135, it actuates a relay 136 to effect transmission of an operation-initiating pulse through a main switching arrangement or control 137 to the die-cut unit 33, and the relay 136 also automatically resets the pulse counter 135. As previously described, the low-speed die cut selector switch 66 is closed when the unit 33 has been selected for use in the system, so this operation-initiating pulse will be effective to energize the clutch coil 88 to initiate a cyclic cyclic operation of the unit 33 in the manner earlier noted herein. The control 137 at the same time makes the circuit to the brake coil 85 hot so that the resulting operation of cam 87 to close switch 86 will cause the brake coil to be energized to terminate the cyclic operation of the unit 33.

Setting the switch 125 to its upper active "A" position and switch 126 to its lower active position for Logic II renders operative a normally inoperative photoelectric scanner 138 (FIG. 8) which is positioned at the inlet side of the die cut for operation in response to the passing by of dough pieces on the conveyor belt 12 or register marks thereon to effect transmission in well-known manner of an operation-initiating pulse through a photoelectric control 139, which is similar to the control 137, and causes cyclic operation of unit 33 by energizing clutch coil 88 and rendering the circuit to brake coil 85 hot.

Likewise, a cyclic operation of unit 33 is initiated for energizing clutch coil 88 and rendering the circuit to brake coil 85 hot by a normally inoperative "Electro-seal" timer 141 (FIG. 8) emitting an operation-initiating pulse periodically in well-known manner when switch 125 is set to its lower active "B" position and switch 127 is set to its upper position for Logic III. The timer 141 includes the usual means selectively operable to vary the interval between such successive energizations of the pulse-responsive means to determine the frequency of operations of the die cut unit 33, and a potentiometer 142 may be employed to visually indicate the selected time interval.

Logic IV is a somewhat different mode of operation of the die cut unit 33 which may be selected by setting the switches 125 and 127 to their lower active positions. This result in maintaining the clutch coil 88 energized and disconnects all power to the brake coil 85 to operate the die cut head continuously.

Thus it will be seen that the low-speed die cut unit 33 not only is capable of cutting and sealing long lengths of dough strips, filled or unfilled, but permits of scroll type cutting, etching, etc., because of the facility with which different types of dies may be employed, such as stripper blade, scrapless patty shell, and stamping speciality dies. It provides a positive walk system for the cutting portion of the die which is essential to and assures accurate movement of the die without any belt grab or resistance to the movement of the conveyor belt when the die is completing its downward stroke. Intermittent cutting of any desired range and length of cut, with from one to sixty cuts per minute may be accomplished with the several pulse control means provided, and it is always assured that with any selected operation a full cycle will be completed and the die stopped for safety in it uppermost position.

As an additional safety precaution, a microswitch 143 is provided which is held closed by the pivoted hood 144 of the low-speed die cut unit 33, as shown in FIG. 3, and will open automatically whenever the hood is raised. A similar safety switch 143 cooperates in like manner with the hood of the high-speed guillotine unit 34. As illustrated in FIG. 5, these two switches 143 are connected in series with each other in the control circuit for the production system so that operation of the system will be stopped automatically upon raising of the hoods of either of the die cut units 33 or 34.

It is thought that the invention and many of its attendant advantages will be understood from the foregoing description, and it will be apparent that various changes may be made in the form, construction, and arrangement of the parts without departing from the spirit and scope of the invention or sacrificing all of its material advantages, the form hereinbefore described and shown in the drawings being merely a preferred embodiment thereof.

I claim:

1. A pastry product production system for programmed sheeting, forming and cutting operations, comprising sheeting means for receiving pastry dough and rolling the same into a continuous sheet and including variable speed motor driving means; makeup conveyor means for receiving said dough sheet and including a second variable speed motor driving means; cutting means including variable speed motor driving means; and a control unit including means operable to synchronize said several variable speed motor driving means and to individually and adjustably control operation of said sheeting, makeup and cutting means to selectively program the production of different types of products.

2. A pastry production system according to claim 1, wherein said control unit means comprises a variable speed generator for supplying alternating current to all of said motor driving means and selectably varying the frequency thereof.

3. A pastry production system according to claim 2, wherein said means to individually adjustably control operation of said sheeting, makeup and cutting means comprises transmission means individually associated therewith and separately adjustable to effect the desired programming of the system.

4. A pastry production system according to claim 3 wherein each said transmission means comprises a speed-change mechanism associated with a said individually adjustable control means.

5. A pastry production system according to claim 4, wherein said control unit includes means for indicating the output speed of each said transmission means, and selectively operable controls for actuating said speed-change mechanisms.

6. In a pastry product production system according to claim 2, wherein said makeup conveyor means includes selectively operable cross roller, flour brush, dough oiler, cinnamon duster, rotary cutter, paste spreader and filling depositor, and roll winder means, finishing means comprising conveyor means for receiving formed products from said makeup conveyor means, and variable speed motor driving means receiving operating current from said variable speed generator.

7. A pastry production system according to claim 1, wherein said cutting means comprises a high-speed guillotine unit and a low-speed die cut unit, and said driving means therefor comprises a third and a fourth variable speed motor driving means for said guillotine and die cut units, respectively.

8. A pastry production system according to claim 7, wherein said driving means for said low-speed die cut unit comprises a normally inoperative clutch, and pulse-responsive means automatically operable to effect cyclic operation of said clutch.

9. In a pastry production system according to claim 8, pulse control means for effecting periodic energizations of said pulse-responsive means.

10. In a pastry production system according to claim 9, means selectively adjustable to vary the time interval between successive energizations of said pulse-responsive means.

11. In a pastry production system according to claim 8, wherein said low-speed die cut unit comprises a vertically reciprocal die, brake means automatically operable to terminate each cyclic operation of said clutch to stop said die at its uppermost position.

12. In a pastry production system according to claim 11, a protective hood for said die cut unit, and a safety switch automatically operable in response to movement of said hood to stop operation of said system and operate said brake means.

13. In a pastry production system according to claim 11, a die guide reciprocable horizontally to move the cutting portion of said vertically reciprocal die with the dough being cut as the same is being moved horizontally by said makeup conveyor means.

14. In a pastry production system according to claim 13, selectively adjustable means for varying the horizontal throw of said die guide.

15. In a pastry product production system according to claim 1, finishing means including conveyor means for receiving formed products from said makeup conveyor means, and variable speed motor driving means controlled by said control unit.